United States Patent [19]

Haacke

[11] 3,907,716

[45] Sept. 23, 1975

[54] COPPER OXIDATION CATALYSTS AND METHOD FOR PREPARING THE SAME

[75] Inventor: Gottfried C. Haacke, Stamford, Conn.

[73] Assignee: American Cyanamid Company, Stamford, Conn.

[22] Filed: Mar. 22, 1974

[21] Appl. No.: 453,618

[52] U.S. Cl. .............. 252/471; 252/474; 423/213.2; 423/213.5; 423/437; 423/599
[51] Int. Cl.² ........................................... B01J 23/34
[58] Field of Search ......... 252/471, 474; 423/213.2, 423/599

[56] References Cited
UNITED STATES PATENTS

| | | |
|---|---|---|
| 2,025,140 | 12/1935 | Wenzel ........................... 423/213.2 |
| 3,839,545 | 10/1974 | Schwab et al ................... 252/471 X |
| 3,840,642 | 10/1974 | Negra et al. .................... 423/213.7 |

*Primary Examiner*—W. J. Shine
*Attorney, Agent, or Firm*—Harry H. Kline

[57] ABSTRACT

There are provided novel oxidation catalysts of the class having the structure:

$$Cu_x Co_y Mn_z O_4$$

where $x$ is 0.1–0.6, $y$ is 1.4 to 2.6 and $z$ is 0.3 to 1.0 and where $x+y+x=3.0$, and utilizing such oxides as catalysts to convert hydrocarbons and carbon monoxide to carbon dioxide in an auto exhaust system.

7 Claims, No Drawings

COPPER OXIDATION CATALYSTS AND METHOD FOR PREPARING THE SAME

The present invention relates to novel non-noble metal oxidation catalysts having good oxidation activity and high thermal stability. More particularly, the invention is concerned with certain copper cobalt manganese oxides, defined hereinbelow, which exhibit enhanced oxidation activity and high thermal stability.

It is known that cobalt oxides exhibit good oxidation activity. Unfortunately, they exhibit relatively poor thermal stability at elevated temperatures. Such temperatures are necessarily utilized for oxidation catalysts in auto exhaust systems, for example. Therefore, if an oxidation catalyst can be provided which is both of good oxidation activity over a wide range of temperatures and high thermal stability, such catalyst would satisfy a long felt need in the art.

It has been unexpectedly found that a copper cobalt manganese oxide having the structure:

$$Cu_x Co_y Mn_z O_4$$

where $x$ ranges from 0.1 to 0.6, $y$ ranges from 1.4 to 2.6, $z$ ranges from 0.3 to 1.0 and where $x+y+z$ is 3.0, exhibits good oxidation activity and high thermal stability. As such, the copper cobalt manganese oxide, above defined, finds utility as an oxidation catalyst, particularly as an oxidation catalyst in a catalyst auto exhaust system which requires the oxidation of hydrocarbons and carbon monoxide at relatively low reaction temperatures but high thermal stability.

According to the process of the invention, the novel oxides are prepared by dissolving in an aqueous medium stoichiometric quantities or predetermined equivalent amounts of (a) a copper salt, such as copper nitrate or copper chloride (b) a cobalt salt, such as cobalt nitrate or cobalt chloride and (c) a manganese salt, such as manganese nitrate or manganese chloride. The resultant mixture which comprises a mixed salt solution is next introduced as by spraying into a liquid nitrogen filled container. Upon completion of the latter step, the liquid nitrogen is evaporated and the contents in the container are subjected to vacuum distillation where water and other solute are removed leaving a solid residue. The latter is heated to a temperature between about 225°C. and about 275°C. to convert the nitrates to fluffy oxides which additionally possess a surface area of from about 125 m²/g to about 180 m²/g and black coloration.

In a preferred practice, it is advantageous to employ 1 to 5 equivalents of a copper salt, 12 to 21 equivalents of a cobalt salt, and 1 to 5 equivalents of a manganese salt. Utilizing the aforementioned quantities of salt, oxides of superior, enhanced oxidation activity and thermal stability are attained.

To further illustrate the invention the following examples which are merely illustrative are presented. It is understood that the examples presented are not deemed to be limitative. Unless otherwise noted, the parts stated are by weight.

EXAMPLE 1

Preparation of $Cu_{0.5} Co_{2.1} Mn_{0.4} O_4$

In a suitable vessel are added 3.45 gms. of cupric nitrate [Cu(NO$_3$)$_2$ . 3H$_2$O], 17.46 gms. of cobalt nitrate [Co(NO$_3$)$_2$ .6H$_2$O], and 3.93 gms. 52% of manganese nitrate [Mn(NO$_3$)$_2$] solution. Resultant mixture is dissolved in 250 parts of water. This nitrate solution is introduced into a chromatography sprayer and sprayed into a suitable beaker filled with liquid nitrogen standing in a liquid nitrogen-containing dewar flask. After completion of the spraying, the beaker containing the frozen material is removed manually from the dewar and the liquid nitrogen is boiled off. As soon as the liquid nitrogen evaporated, the beaker is transferred to a bell jar of a high vacuum (10$^{-6}$mm Hg) system and the system kept under vacuum until all the solution and hydration water had been removed.

The completely dried material is kept under vacuum and decomposed to the mixed oxides by slowly heating it to approximately 250°C. Decomposition of the mixed nitrates to oxides is accompanied by a color change from pink/purple to black. After turning black throughout, the material is removed from the vacuum system. It is extremely fluffy and has a surface area of about 150 m²/g. The derived material is finally obtained by annealing the mixed oxide for 72 hours at 650°C. in oxygen. Upon completion of the heat treatment step, the material is crystallized in a spinel lattice according to X-ray analysis. Its surface area is 8 m²/gm. and is stable for at least 24 hours at 1000°C. in air.

EXAMPLE 2 preparation of $Cu_{0.25} Co_{2.35} Mn_{0.4} O_4$

The procedure of Example 1 is repeated in every respect except that 19.63 gms. of cobalt nitrate [Co(NO$_3$)$_2$ . 6H$_2$O], 1.73 gms. of cupric nitrate [Cu(NO$_3$)$_2$ . 3H$_2$O], and 3.95 gm. 53% of manganese nitrate [Mn(NO$_3$)$_2$] solution are dissolved in 250 parts of water. Spraying, vacuum drying, and heat treatment are performed as for $Cu_{0.5} Co_{2.1} Mn_{0.4} O_4$ in Example 1 above. The resulting material is found to be crystallized in the spinel phase. Its surface area was 9m²/gm and is stable at 1000°C. in air for 24 hours.

EXAMPLE 3-6

This example illustrates the utility of the compounds in the above example as effective oxidation catalyst.

Catalyst performance is determined by measuring the hydrocarbon and carbon monoxide conversion as a function of reaction temperature. The percentage of conversion measured by a vapor phase chromatograph is automatically plotted by an X-Y recorder as a function of temperature. The temperature on the graph corresponding to 50% conversion is defined as the light-off temperature and is used to compare the oxidation activities of different catalyst compositions. A low light-off temperature indicates a high oxidation activity.

The reactor for measuring the light-off temperature consists of a stainless steel tubing in which a given amount of catalyst sample is placed. It is located in a heated air bath whose temperature is precisely controlled and could be automatically changed by a programed temperature controller. A coil of stainless steel tubing at the inlet of the reactor serves as a preheater of the test gas which is flowing through the system at a constant space velocity. Usually, 1 cc of the catalyst per 25,000 cc to 50,000 cc per hour of the gas composition which consists of a mixture of carbon monoxide, oxygen, propylene, and nitrogen which has been bubbled through a constant temperature bath so that it acquired 10% water, is employed. However, in each of the examples tabularized below, 40,000 cc per hour of the gas composition are contacted by the recited catalyst.

After passing through the reactor the oxidized reaction products are introduced into a vapor phase chromatograph for analysis. The percentage of carbon monoxide oxidized to carbon dioxide and the percentage of propylene oxidized to carbon dioxide and water are determined by the chromatograph and the data fed into an X-Y recorder. The data is set forth in the tabular form below.

TABLE I

| Example | Catalyst | $T_{HC}$ (°F) | $T_{CO}$ (°F) |
|---|---|---|---|
| 3 | $Cu_{0.5} Co_{2.1} Mn_{0.4} O_4$ | 301 | 436 |
| 4 | $Cu_{0.5} Co_{2.35} Mn_{0.4} O_4$ | 477 | 383 |
| 5 | $CO_{2.6} Mn_{0.4} O_4$ (Control) | 438 | 485 |
| 6 | $CO_3 O_4$ (Control) | 323 | 267 |

Advantageously, the catalysts of the present invention exhibit both good oxidation activity with respect to the low light-off temperatures and good thermal stability.

I claim:

1. A compound having the structure:

$$Cu_x CO_y Mn_z O_4$$

where $x$ is 0.1 to 0.6, $y$ is 1.4 to 2.6, $z$ is 0.3 to 1.0 and where $x+y+z$ equals 3.

2. The compound of claim 1 wherein $x$ is 0.5, $y$ is 2.1, $z$ is 0.4.

3. The compound of claim 1 wherein $x$ is 0.25, $y$ is 2.35 and $z$ is 0.4.

4. A process for the preparation of the copper cobalt manganese oxide compound of claim 1 which comprises the steps of: dissolving in an aqueous medium a copper salt, a cobalt salt, and a manganese salt in predetermined equivalent amounts, introducing the solution into a container filled with liquid nitrogen, evaporating the contents therein under vaccum and heating the solids recovered at a temperature between about 225°C. and 275°C., heating resultant mixture to a temperature of 650°C. for 72 hours in the presence of oxygen, and recovering the copper cobalt manganese oxide therefrom.

5. The process according to claim 4 wherein the cobalt salt is cobalt nitrate.

6. The process according to claim 4 wherein the manganese salt is manganese nitrate.

7. The process according to claim 4 wherein the copper salt is cupric nitrate.

* * * * *